Jan. 30, 1923.

E. M. McCLURE ET AL.
CHILD'S VEHICLE.
FILED DEC. 8, 1921.

1,443,424.

2 SHEETS—SHEET 1.

Inventors,
E. M. McClure &
J. O. McMurphy,
By C. A. Snow & Co.
Attorneys

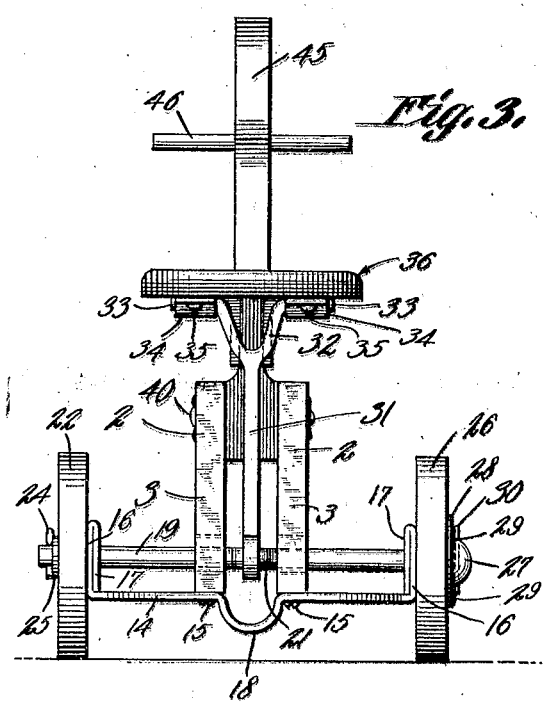
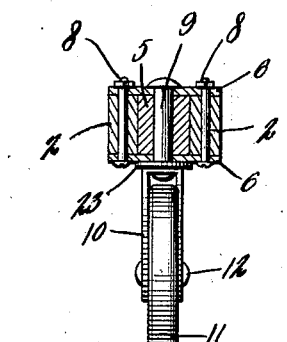
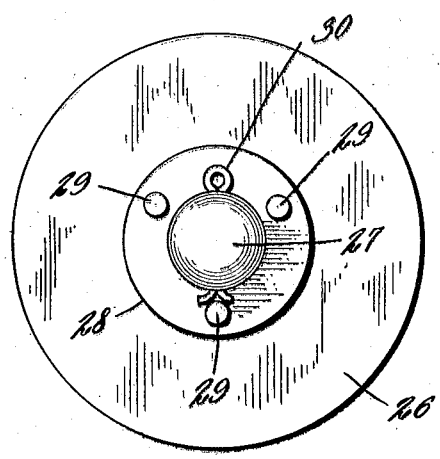
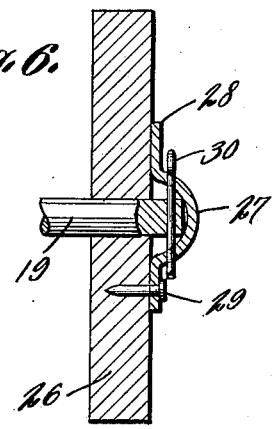

Patented Jan. 30, 1923.

1,443,424

UNITED STATES PATENT OFFICE.

EDD MILLIS McCLURE AND JAMES OMER McMURPHY, OF LAMAR, MISSOURI, ASSIGNORS OF ONE-THIRD TO FRANK PIERSEN WEBER, OF LAMAR, MISSOURI.

CHILD'S VEHICLE.

Application filed December 8, 1921. Serial No. 521,020.

*To all whom it may concern:*

Be it known that we, EDD MILLIS Mc-CLURE and JAMES OMER McMURPHY, citizens of the United States, residing at Lamar, in the county of Barton, State of Missouri, have invented a new and useful Child's Vehicle, of which the following is a specification.

The device forming the subject matter of this application is a vehicle adapted to be used by small children and the invention aims to provide novel means for propelling and steering the vehicle. Another object of the invention is to provide a vehicle of the kind mentioned which may be manufactured simply and cheaply, the device being capable of standing hard use.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
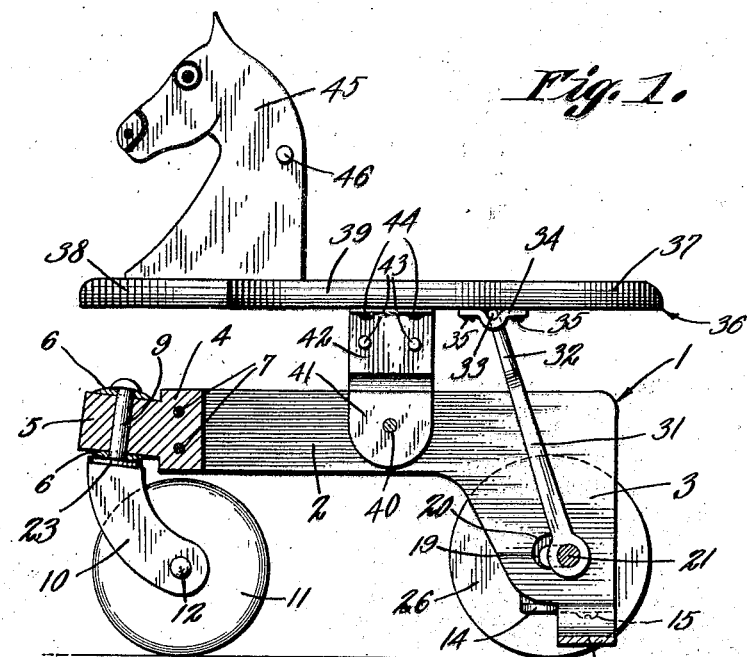
Figure 2:
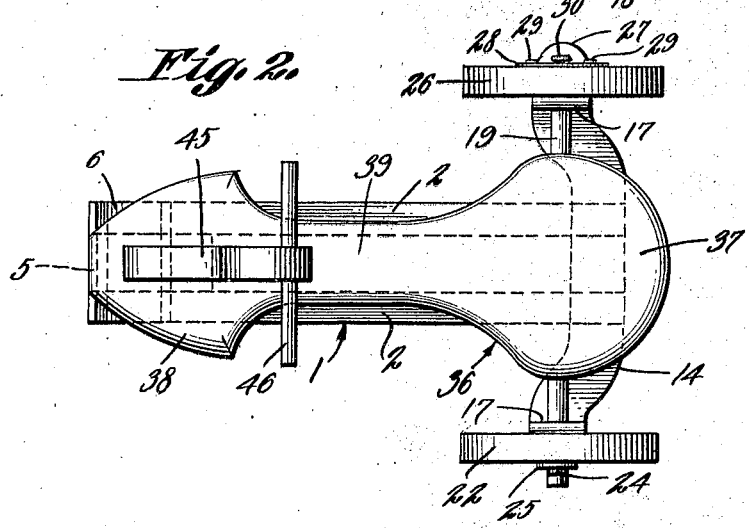

Figure 1 shows in side elevation, a device constructed in accordance with the invention, parts being in section; Figure 2 is a top plan; Figure 3 is a rear elevation; Figure 4 is a fragmental transverse section taken through the frame adjacent to the forward end thereof; Figure 5 is an elevation showing one of the rear wheels; Figure 6 is a section of the structure depicted in Figure 5.

In carrying out the invention, there is provided a frame 1 comprising side members 2 in the form of bars, supplied at their rear ends with depending extensions 3. A spacer 4 is located between the forward ends of the side bars 2 and is held in place by securing elements 7, the spacer 4 having an upwardly and forwardly inclined tongue 5 located between the side bars 2, the side bars being cut away upon their upper and lower edges to correspond with the inclination of the tongue 5. Plates or retainers 6 extend transversely of the side bars 2 at the forward ends thereof, and extend across the tongue 5 of the spacer 4. Securing devices 8 connect the plates 6 with the forward ends of the side bars 2, as shown in Figure 4.

A shaft 9 is mounted to rotate in the tongue 5 of the spacer 4 and in the plates 6. The shaft 9 is disposed at right angles to the tongue 5, as shown in Figure 1, but because the tongue 5 is upwardly and forwardly inclined, the shaft 9 is rearwardly inclined from its lower end toward its upper end. The shaft 9 may be fixed in the spacer tongue 5, if desired. A U-shaped frame 10 is mounted to swing on the lower end of the shaft 9, a washer 23 being interposed between the upper portion of the frame 10 and the adjacent plate 6. A front wheel 11 is located in the frame 10 and is journaled on an axle 12 carried by the frame 10.

A bar 14 extends transversely of the depending extensions 3 of the side bars 2 and is connected thereto by securing elements 15. The bar 14 is provided at its outer ends with upstanding arms 16 terminating in depending fingers 17, in contact with the arms 16. Intermediate its ends, the bar 14 is provided with a depending U-shaped extension 18.

An axle 19 is journaled for rotation in the arms 16 and in the fingers 17, the arms and the fingers forming an adequate support for the axle. The axle passes through enlarged openings 20 formed in the extensions 3 of the side bars 2. Intermediate its ends, the axle 19 is provided with a crank 21. The U-shaped part 18 of the bar 14, accommodates the crank 21 when the vehicle is in operation. A wheel 22 is loose on the axle 19 but is held thereon, for rotation, by a cotter pin 24 and a washer 25, or in any other suitable way. The axle 19 passes through a wheel 26 and through the bulged portion 27 of a hub plate 28 attached by securing devices 29 to the wheel. A cotter pin 30 or the like extends through the bulged portion 27 of the hub plate 28 and through one end of the axle 19, as shown in Figure 6, the wheel 26 thus being connected to the axle 19, to rotate therewith. Since the wheel 26 is secured to the axle 19, the wheel 22 being rotatable on the axle, the effect of a differential is secured, by an exceedingly simple mechanism.

A pitman 31 is disposed between the side bars 2 of the frame 1, the lower end of the pitman being mounted pivotally on the crank 21 of the axle 19. At its upper end, the pitman 31 is provided with a fork 32 having outwardly extended journals 33, mounted to rock in bearings 34 held by securing elements 35 on a platform 36 having an enlarged rear end 37, and including an enlarged forward end 38, the elements 37 and 38 being connected by a reduced neck 39. A pivot element 40 is mounted in the side bars 2, and on the pivot element, a standard 41 is mounted to swing, the standard extending downwardly between the side bars 2. Angle brackets 42 are shown, the depending arms of the angle brackets being connected by securing elements 43 to the standard 41, the outstanding arms of the angle brackets being connected by securing elements 44 to the reduced neck 39 of the platform 36. At its forward end, the platform 36 is equipped with an upstanding projection 45, which may be a figure simulating the appearance of the head of a horse or other animal, a transverse handle 46 being carried by the part 45.

In practical operation, the child operating the vehicle straddles the reduced neck 39 of the platform 36 and walks along the floor, the weight of the child being carried, if desired, by the platform 36. When rotation is imparted to the axle 19 from the wheel 26 motion will be transmitted to the platform 36 by the pitman 31; the standard 41 swinging on the pivot element 40, the figure 45 swinging upwardly and downwardly, so as to represent the galloping of a horse.

Owing to the fact that the frame member 10 extends rearwardly, the wheel 11 is so disposed with respect to the shaft 9 that the vehicle will tend to keep a straight course. When, however, the operator exerts a lateral thrust with one foot upon the floor, the vehicle may be turned in any direction. Owing to the fact that the shaft 9 is rearwardly inclined from its forward end toward its upper end, the operator can steer or turn the vehicle laterally, without appreciable effort, notwithstanding the fact that the rearwardly inclined member 10 normally tends to keep the vehicle on a straight course.

Having thus described the invention, what is claimed is:

In a device of the class described, a frame comprising side bars; a wheel carried by the forward end of the frame; a platform mounted to tilt on the frame; a bar extended transversely of the side bars and located at the rear thereof, the bar being provided intermediate its ends with a depending extension, and being supplied at its ends with upstanding arms; an axle located in the arms and provided with a crank movable through the extension; wheels carried by the axle and held against inward movement by the arms; and a pitman forming a connection between the crank and the platform.

In testimony that we claim the foregoing as our own, we have hereto affixed our signatures in the presence of two witnesses.

EDD MILLIS McCLURE.
JAMES OMER McMURPHY.

Witnesses:
HARLEY C. KINKEAD,
AMOS GAGE.